United States Patent
Hughes et al.

(10) Patent No.: US 8,245,079 B2
(45) Date of Patent: Aug. 14, 2012

(54) CORRELATION OF NETWORK ALARM MESSAGES BASED ON ALARM TIME

(75) Inventors: George L. Hughes, Wesley Chapel, FL (US); Tahir G. Mulla, Tampa, FL (US); Jonathan L. Spieker, Colorado Springs, CO (US); Michael L. Turok, Waban, MA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 38 days.

(21) Appl. No.: 12/886,789

(22) Filed: Sep. 21, 2010

(65) Prior Publication Data

US 2012/0072782 A1 Mar. 22, 2012

(51) Int. Cl.
*G06F 11/00* (2006.01)

(52) U.S. Cl. ............... 714/26; 714/4.1; 714/25; 714/43; 714/49; 714/57

(58) Field of Classification Search .................... 714/4.1, 714/25, 26, 43, 49, 57
See application file for complete search history.

(56) References Cited

U.S. PATENT DOCUMENTS

| 5,539,877 | A | * | 7/1996 | Winokur et al. | ................. | 714/26 |
| 6,256,670 | B1 | * | 7/2001 | Davies | ........................... | 709/224 |
| 7,664,986 | B2 | * | 2/2010 | Angamuthu et al. | ........... | 714/27 |
| 7,965,620 | B2 | * | 6/2011 | Gadgil et al. | ................. | 370/216 |
| 8,032,779 | B2 | * | 10/2011 | Clemm et al. | ................. | 714/4.1 |
| 2005/0276217 | A1 | * | 12/2005 | Gadgil et al. | ................. | 370/225 |

* cited by examiner

*Primary Examiner* — Charles Ehne

(57) ABSTRACT

Problems in a network may be diagnosed based on alarm messages received from devices in the network and based on logical circuit path information of the network. In one implementation, a device may log alarm messages, in which each of the logged alarm messages may identify a network device that generated the alarm message and each of the alarm messages are associated with a time value. The device may group the alarm messages in the log of alarm messages based on the time values of the alarm messages to obtain one or more alarm message clusters and analyze the alarm message clusters to locate potential causes of the logged alarm messages.

20 Claims, 9 Drawing Sheets

| DEVICE ID | ALARM TIMESTAMP | ERROR CODE |
|---|---|---|
| ROUTER123 | MAY 5, 2010, 17:03:18 | LINK FAILURE: INTERFACE 0 |
| GATEWAY10 | MAY 5, 2010, 17:03:20 | INTERNAL FAILURE |
| ... | ... | ... |

Fig. 5

CORRELATION OF NETWORK ALARM MESSAGES BASED ON ALARM TIME

BACKGROUND

Backbone networks include networks designed to provide a path for the exchange of information between different local area networks (LANs) or subnetworks. Backbone networks may frequently be relatively large networks that traverse a large geographical area and that may be made up of numerous network devices (e.g., routers, switches, etc.) and network links, such as links made of fiber optic or copper wire cabling.

Network devices in a network, such as a backbone network, may be configured to emit alarm messages in response to the occurrence of certain error conditions. The alarm messages may be delivered to a network management center. Network administrators may then examine the alarm messages to determine how to correct the error condition. For example, if a link in the network is physically cut, routers on opposite ends of the link may send alarm messages to the network management center. From the alarm messages, a network administrator may conclude that there is a problem with the physical link and, in response, may dispatch a technician to inspect the link.

For a backbone network, the number of alarm messages received at the network management center can be voluminous, potentially making the diagnosis of the underlying problem difficult. Determining the underlying network problem can be particularly troublesome in situations in which the available network topology information is unavailable, incomplete, or contains errors.

BRIEF DESCRIPTION OF THE DRAWINGS

FIG. 5 is a diagram illustrating an example of a data structure that may be used to implement an alarm log;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may relate to the diagnosis of problems in a network based on alarm messages received from devices in the network. The alarm messages may be clustered based on the time at which the alarm messages are generated. Based on the alarm message clusters and on circuit information for the network, problems in the network can be diagnosed and output to a network administrator. The techniques described herein may be performed even without the availability of detailed network topology information.

Figure 1:
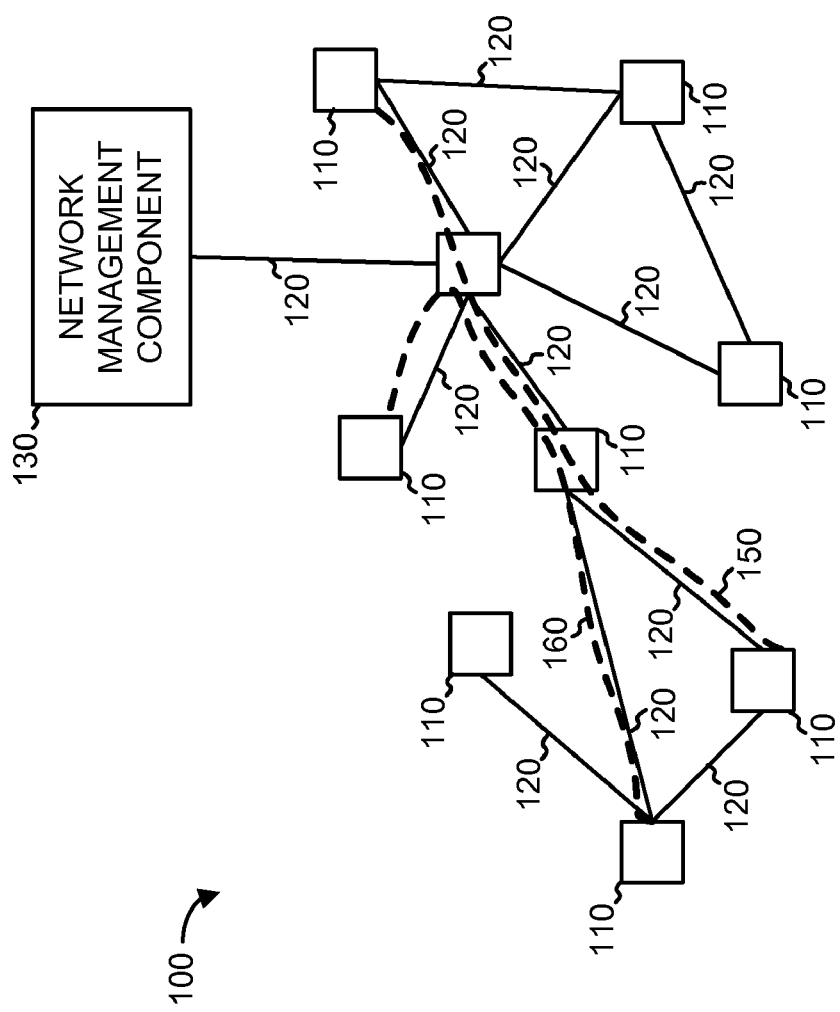
FIG. 1 is a diagram of an example network in which systems and/or methods described herein may be implemented.

FIG. 1 is a diagram of an example network 100 in which systems and/or methods described herein may be implemented. Network 100 may represent a portion of a network, such as a backbone network. Network 100 may include a number of nodes 110. Nodes 110 may be connected to one another by links 120. Nodes 110 and links 120 may collectively implement a network, such as a packet switched network, that is used to provide telecommunications services or other services. Network management component 130 may also be part of network 100 and may represent a centralized location for monitoring and analyzing network error conditions.

Each of nodes 110 may represent a network device in network 100. For example, a node 110 may include a router, a switch, a bridge, a gateway, a server, or another network device used to implement or provide services associated with network 100. Nodes 110 may generate alarm messages in response to the detection of error conditions. The error conditions may include, for example, link failure, link degradation, link congestion, software errors, or other error conditions.

Links 120 may include physical media used to connect nodes 110. Each of links 120 may be, for example, fiber optic cable, twisted pair copper cable, coaxial cable, wireless links (e.g., a satellite relay), or other another type of link. Different links 120 may use different physical media. For example, a long distance link, such as one on the order of miles or many miles, may include fiber optic cabling while shorter links between two network devices 110 may include twisted pair copper cabling.

Network management component 130 may include a computing device or a collection of computing devices used to monitor and manage network 100. For example, network management component 130 may include a number of user workstations located within a facility used by network administrators. Alarm messages generated by nodes 110 may be configured to be delivered to network management component 130. Based on the alarm messages and potentially based on other information, network management component 130 may visually display the status of network 100 to the network administrators. Based on the status of network 100, the network administrators may, if necessary, take remedial action, such as adjusting network routing parameters or dispatching technicians to the physical sites of nodes 110 or links 120.

Network topology for network 100 may include the physical arrangement of nodes 110 and links 120 of network 100. Logical circuits for network 100 may also be defined and may include paths through network 100. In some implementations, when analyzing alarm messages, the topology of network 100 may not be known or available, may be incomplete, or may include errors. The circuits in network 100, however, may be known. As used herein, a circuit may refer to a path in network 100 between two or more end-point nodes 110. One or more circuits may be implemented over a single physical link. For example, fiber optic cable connecting two nodes 110 may carry data for a number of different circuits.

Two example circuits are shown in FIG. 1 using dashed lines: circuit 150 and circuit 160. Circuit 150 may be a logical connection through network 100 that is used by a first customer or service. Circuit 160 may be a logical connection through network 100 that is used by a second customer or service. Circuits 150 and 160 may, at times, overlap in the physical topology of network 100. As shown, a portion of circuits 150 and 160 may share a single physical link.

Figure 2:
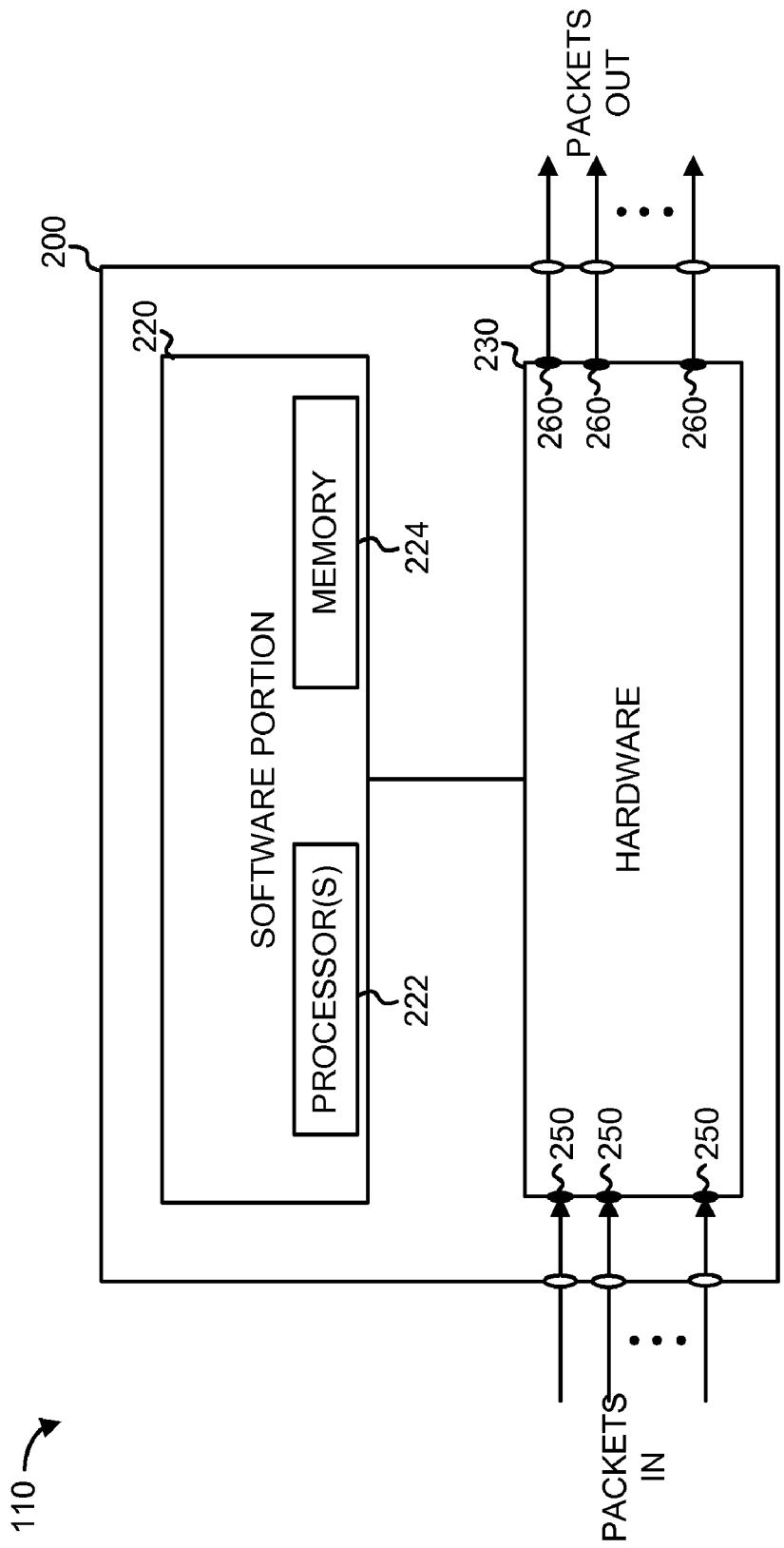
FIG. 2 is a diagram illustrating an example implementation of a node in a network.

FIG. 2 is a diagram illustrating an example implementation of a device 200 included in node 110. Device 200 may include a software portion 220 and a hardware portion 230. Software portion 220 may include software designed to control device 200. Software portion 220 may, for example, implement an operating system for device 200 and may execute processes designed to implement the network protocols used by device 200. Software portion 220 may control hardware portion 230 and provide an interface for user configuration of node 110. In general, software portion 220 may implement the functions of the node 110 that are either related to control or that can be implemented in a "slow path" through device 200. Software portion 220, although shown as a single abstract block 220 in FIG. 2, may be implemented through, for example, one or more general purpose processors 222 and one or more computer memories 224. Processors 222 may include processors, microprocessors, or other types of processing logic that may interpret and execute instructions. Computer memories 224 (also referred to as computer-readable media herein) may include random access memory (RAM), read-only memory (ROM), or another type of dynamic or static storage device that may store information and instructions for execution by processors 222.

Hardware portion 230 may include circuitry for efficiently processing packets received by device 200. Hardware portion 230 may include, for example, logic, such as an application specific integrated circuit (ASIC), a field programmable gate array (FPGA), and/or a ternary content-addressable memory (TCAM). Hardware portion 230 may receive incoming packets, extract header information for the packets, and process the packets based on the extracted header information.

Node 110 may also include ports for receiving and transmitting packets. A number of input ports 250 and output ports 260 are particularly shown for node 110. Packets received at one of input ports 250 may be output at an appropriate one or more of output ports 260. Each port 250 and 260 may connect to physical media (e.g., the media implementing links 120) over which data is transmitted.

Hardware portion 230 of node 110 may include logic to detect errors on links 120 connected to ports 250/260. Software portion 220 may include software designed to detect errors in operation of node 110. These errors may be reported to network management component 130 by node 110 via alarm messages.

Although node 110 is shown as including software portion 220 and hardware portion 230, node 110 may, in some implementations, be implemented entirely through hardware. In some implementations, node 110 may include fewer, different, differently arranged, or additional components than depicted in FIG. 2. Alternatively, or additionally, one or more components of node 110 may perform one or more tasks described as being performed by one or more other components of node 110.

Figure 3:
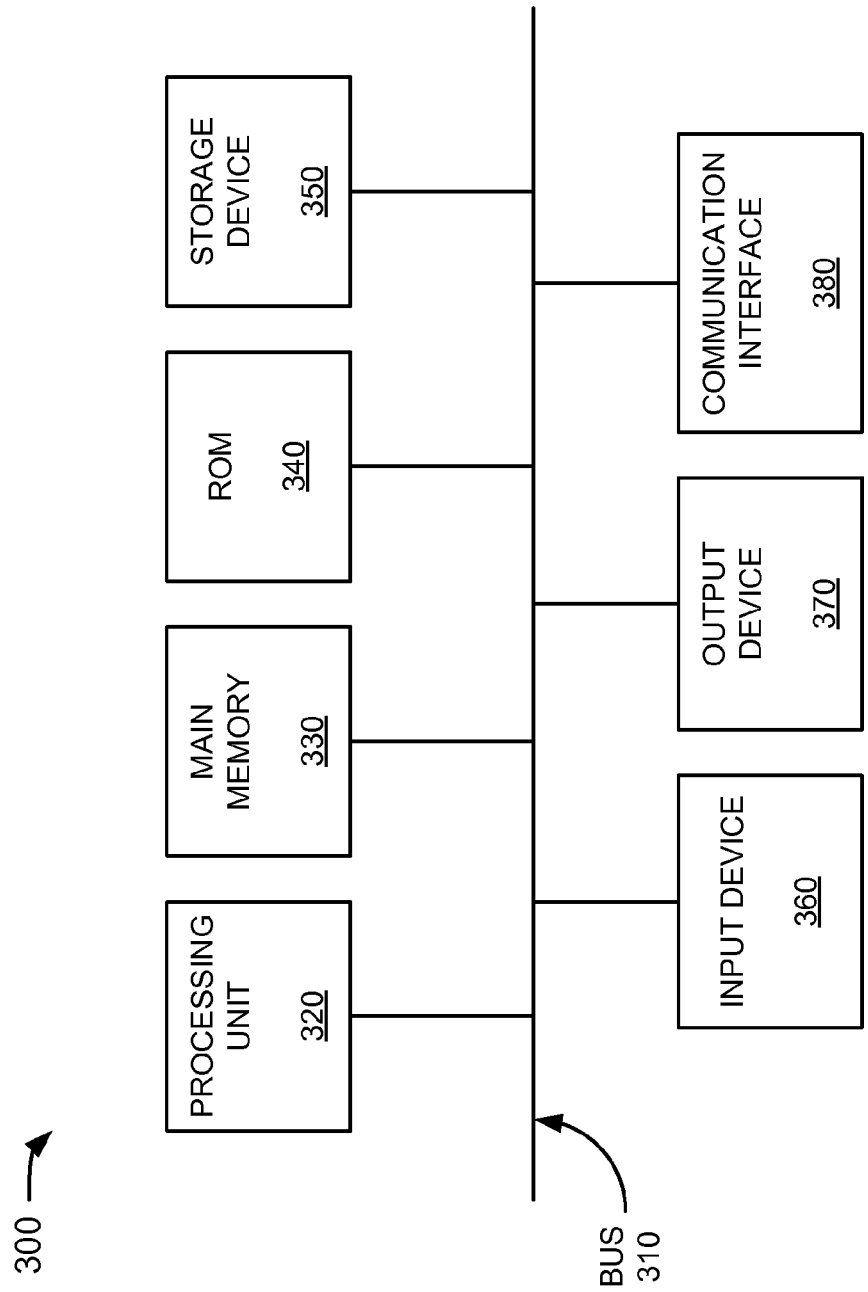
FIG. 3 is a diagram illustrating an example of a computing device included in a network management component.

FIG. 3 is a diagram illustrating an example of a computing device 300 included in network management component 130. In some implementations, network management component 130 may include a number of similar computing devices 300, which may implement software tools used to assist network administrators in the management of network 100.

As illustrated, computing device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of computing devices 300.

Processing unit 320 may include a processor, microprocessor, or other types of processing logic that may interpret and execute instructions. Main memory 330 may include a random access memory (RAM) or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive.

Input device 360 may include a mechanism that permits an operator to input information to computing devices 300, such as a keyboard, a mouse, a pen, a microphone, voice recognition and/or biometric mechanisms, etc. Output device 370 may include a mechanism that outputs information to the operator, including a display, a printer, a speaker, etc. Communication interface 380 may include any transceiver-like mechanism that enables computing devices 300 to communicate with other devices and/or systems. For example, communication interface 380 may include mechanisms for communicating with another device or system via a network.

As will be described in detail below, computing device 300 may perform certain operations in response to processing unit 320 executing software instructions contained in a computer-readable medium, such as main memory 330. A computer-readable medium may be defined as a physical or logical memory device. A logical memory device may include memory space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows components of computing devices 300, in other implementations, computing devices 300 may include fewer, different, differently arranged, or additional components than depicted in FIG. 3. In still other implementations, one or more components of computing devices 300 may perform one or more tasks performed by one or more other components of computing devices 300.

Figure 4:
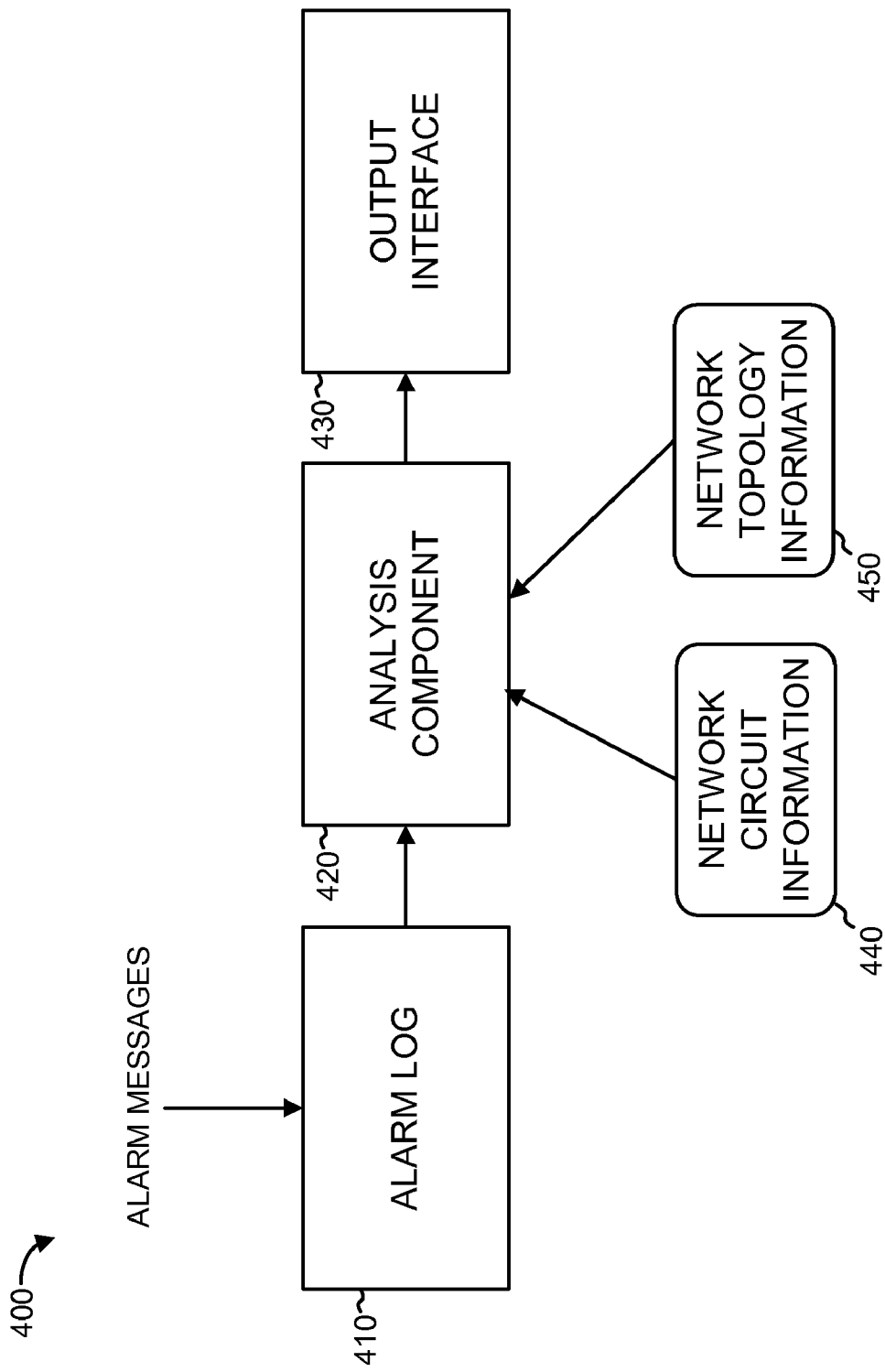
FIG. 4 is a diagram illustrating an example of functional components that may be implemented in a network management component.

FIG. 4 is a diagram illustrating an example of functional components 400 that may be implemented in network management component 130. Functional components 400 may include software executed by one or more computing devices 300. Functional components 400 may include an alarm log 410, an analysis component 420, an output interface 430, logical network circuit information 440, and physical network topology information 450.

Alarm log 410 may receive and store alarm messages from nodes 110. Alarm log 410 may include, for example, a structure, a database, or file used to store the alarm messages.

FIG. 5 is a diagram illustrating an example data structure 500 that may be used to implement alarm log 410. Each entry in data structure 500 may represent a received alarm. A number of example alarm messages 510 are illustrated in data structure 500. Each alarm message may include a device identifier (ID) field 520, an alarm timestamp field 530, and an error code field 540. Device ID field 520 may store an identifier, such as a string identifier, for the node 110 that generated the alarm message. Each node 110 in network 100 may be assigned a unique identifier, which it may include in the alarm message sent to network management component 130. Alarm timestamp field 530 may store the date and time at which the alarm message was generated by node 110. Error code field 540 may store a code indicating the type of error detected by node 110. In some implementations, instead of a code, error code field 540 may store a textual description of the error detected by node 110.

Two example alarm messages are illustrated as being stored in data structure 500. The first alarm message, for instance, includes the device ID "router123" (field 520) and the timestamp value May 5, 2010, 17:03:18 (field 530). The error code is "link failure: interface 0" (field 540). This alarm message may thus indicate that the network device "router123" detected a link failure on one of its interfaces, interface 0. Similarly, the second alarm message shown in data structure 500 includes the device ID "gateway10" (field 520) and the timestamp value May 5, 2010, 17:03:20 (field 530). The error code may be "internal failure" (field 540). This alarm message may thus indicate that the network device "gateway123" detected an internal error in the operation of the network device, such as a software error.

Although FIG. 5 shows exemplary fields stored by data structure 500, in other implementations, data structure 500 may contain fewer or additional fields that describe alarms received from nodes 110.

Returning to FIG. 4, analysis component 420 may generally include logic to analyze alarm messages in alarm log 410. In general, analysis component 420 may output information that network administrators can use to trouble shoot network problems. For example, analysis component 420 may output a prediction of likely trouble nodes 110 or links 120 in network 100. More particularly, analysis component 420 may determine, based on a number of received alarm messages, that a particular link in network 100 has been cut or that a particular node in network 100 is defective.

Analysis component 420 may use logical network circuit information 440 and, in some implementations, physical network topology information 450, when analyzing alarm messages. Logical network circuit information 440 may include an information store that stores information relating to circuits formed in network 100. As previously mentioned, a circuit may refer to a logical path in network 100 between two or more end-point nodes. A circuit may traverse multiple network nodes and/or links. One or more circuits may be implemented over a single physical link. The geographic location of each end-point node may be known. Circuit information for network 100 may be obtained, for example, by network management component 130 by monitoring the provisioning of circuits in network 100. As an example of a circuit specified by end-points and associated with particular geographical locations, consider a first network device located in Chicago and a second network device located in Atlanta, and in which a circuit, "circuit1", connects Atlanta and Chicago. This circuit may thus be assumed to include the first and second network devices.

Analysis component 420 may also use, when available, physical network topology information 450 when analyzing alarm messages. Physical network topology information 450 may describe the physical arrangement and capabilities of nodes 110 and links 120 in network 100. The network topology information may be obtained or provided to network management component 130 when network 100, or parts of network 100, is deployed. In some situations, physical network topology information 450 for network 100 may not be available, may be incomplete, or may be noisy (i.e., it may include errors).

Analysis component 420 may output an indication of one or more potential network problems to output interface 430. Output interface 430 may include, for example, software and/or hardware to present the potential network problems to the network administrators. In one implementation, the potential network problems may be presented through a command-line interface. In another possible implementation, a graphical interface may be used to present the analysis results, such as an interface that graphically illustrates, such as by overlaying error symbols on a map, where potential errors are occurring in network 100.

Although FIG. 4 shows functional components 400 that may be implemented in network management component 130, in other implementations, functional components 400 may include fewer, different, differently arranged, or additional components than depicted in FIG. 4. In still other implementations, one or more of functional components 400 may perform one or more tasks performed by one or more other functional components 400.

Figure 6:
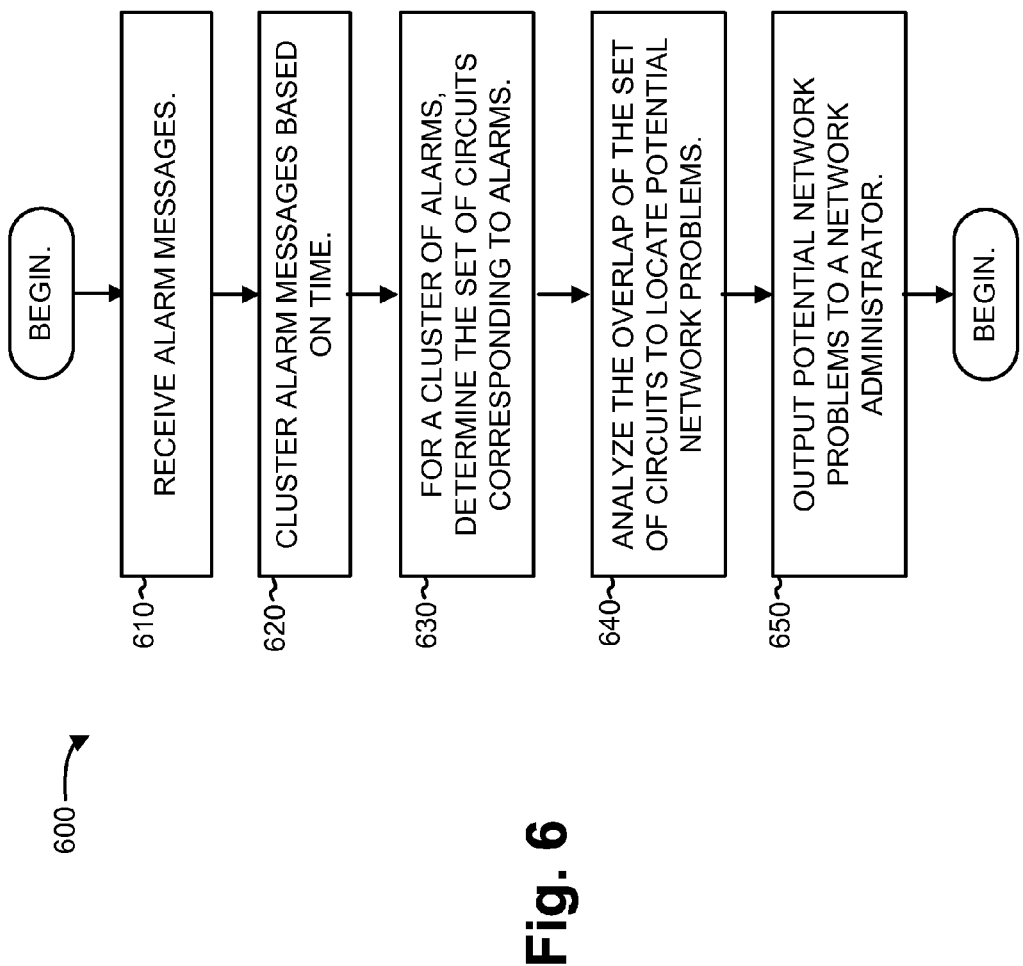
FIG. 6 is a flow chart illustrating an example of a process for analyzing alarm messages to generate indications of potential network problems.

FIG. 6 is a flow chart illustrating an example of a process 600 for analyzing alarm messages to generate indications of potential network problems. In one implementation, process 600 may be performed by analysis component 420.

Process 600 may include receiving alarm messages from nodes 110 where, as previously mentioned, each alarm message may indicate a network error condition (block 610). The alarm messages may be stored in alarm log 410.

Process 600 may further include clustering the received alarm messages based on time, such as the time the alarm message was generated (e.g., as indicated by the timestamp value of the alarm message) (block 620). In general, an adverse network event, such as a link failure, may result in the generation of a number of alarm messages by the various network devices affected by the event. The alarm messages corresponding to a single adverse network event may tend to occur at about the same time. By clustering the received alarm messages based on time, the alarm messages relating to a particular adverse network event may be isolated. Each cluster may thus represent a group of correlated alarm messages.

A number of techniques could be used to cluster or group alarm messages based on time. In one implementation, a sliding fixed size time window, such as a thirty second window, may be continuously used to define time-slices in which all the alarms received in a time-slice may be assigned to a cluster. The window may be advanced in an overlapping manner so, for example, a thirty second window may advance fifteen seconds at a time. Other techniques for clustering the alarm messages based on the timestamp value of the alarm messages may alternatively or additionally be used. For example, a cluster analysis technique such as k-means clustering may be used. In another possible alternative, techniques for categorizing the alarm messages based on time, such as an unsupervised classification technique, may be used.

Figure 7:
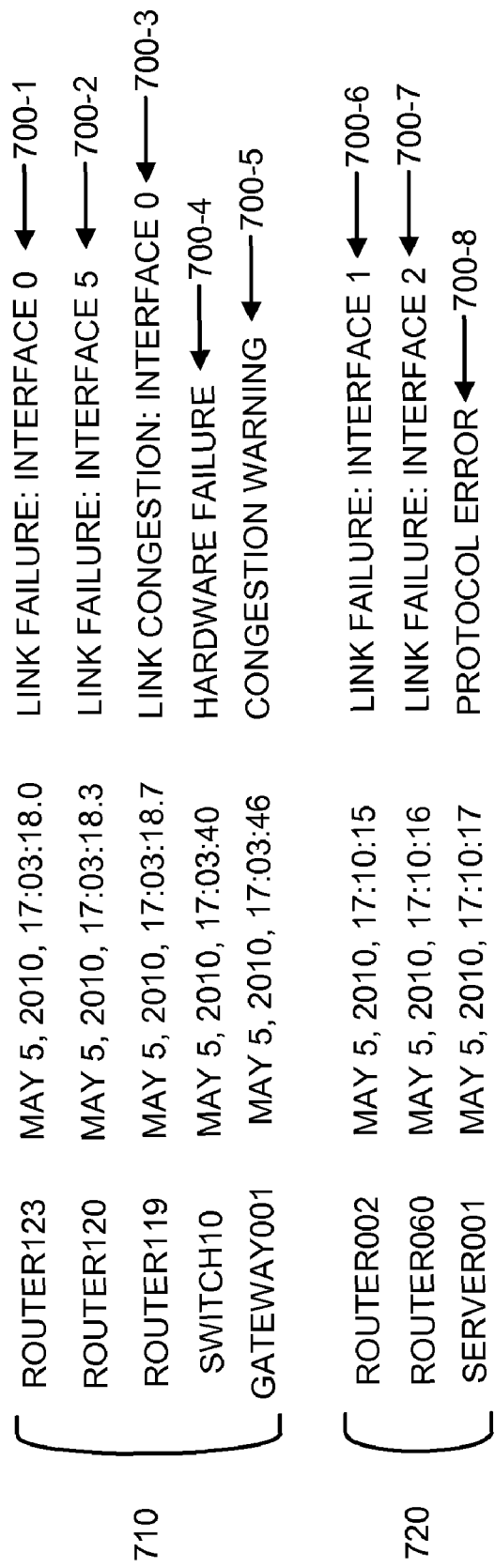
FIG. 7 is a diagram illustrating an example of a series of received alarm messages.

FIG. 7 is a diagram illustrating an example of a series of received alarm messages. As shown in FIG. 7, a number of example alarm messages 700-1 through 700-8 are shown sorted by respective timestamp values of the alarm messages. Assume that, after clustering, alarm messages 700-1 through 700-5 are determined to be in one cluster (cluster 710) and alarm messages 700-6 through 700-8 are determined to be in a second cluster (cluster 720).

As further shown in FIG. 6, process 600 may include, for each determined cluster, determining the circuits that correspond to the alarm messages in the cluster (block 630). Each circuit in logical network circuit information 440 may be specified as a path of network devices or geographic endpoints. Analysis component 420 may form a set of circuits relevant to a cluster of alarm messages as the set including each circuit that includes at least one network device or endpoint corresponding to an alarm message in the cluster. As shown in FIG. 7, for the example cluster of alarm messages 710, the determined set of circuits may be any circuit that includes one or more of the network devices or end-points corresponding to the network devices in alarm messages 710. These network devices include: "router123" (alarm message 700-1), "router120" (alarm message 700-2), "router119" (alarm message 700-3), "switch10" (alarm message 700-4), and "gateway001" (alarm message 700-5).

Figure 8:
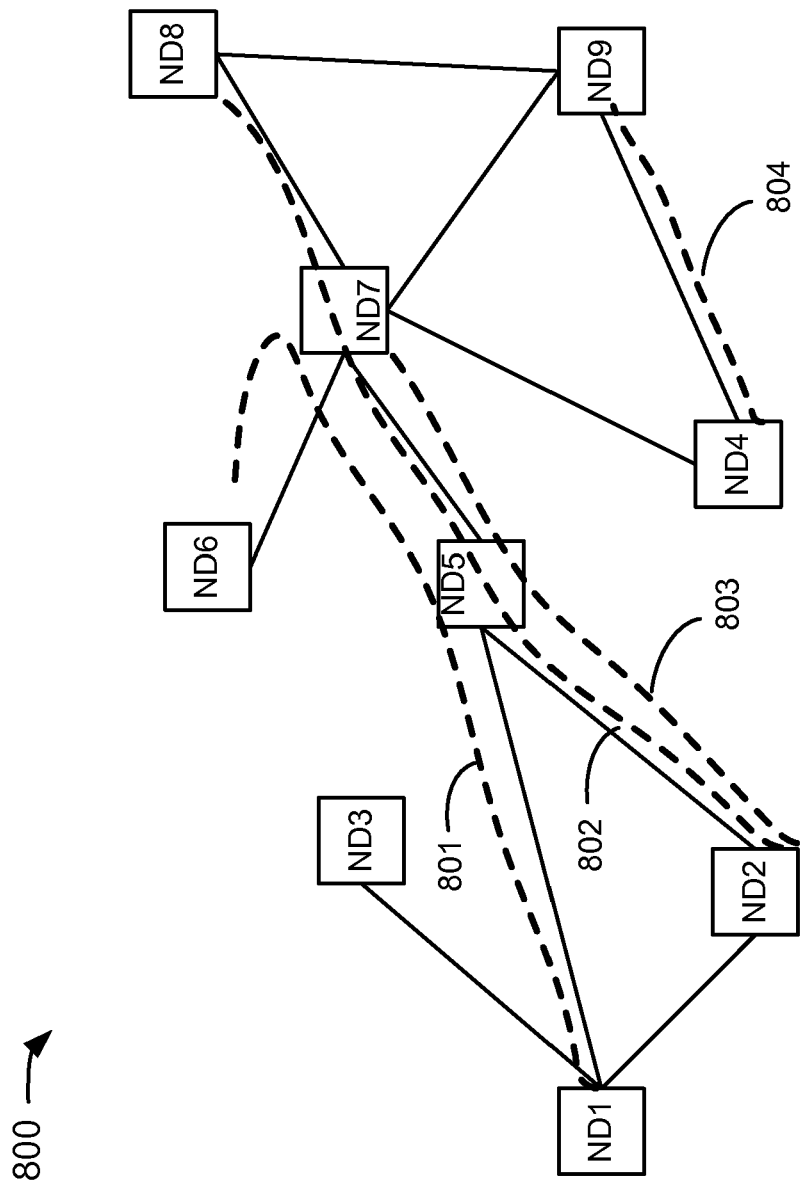
FIG. 8 is a diagram illustrating an example network in which a set of circuits, such as a set of circuits corresponding to alarm messages in a cluster, are graphically illustrated.

FIG. 8 is a diagram illustrating an example network 800 in which a set of circuits, such as a set of circuits corresponding to alarm messages in a cluster, are graphically illustrated. Circuits 801 through 804 are particularly illustrated in FIG. 8, where each circuit is shown as a dashed line. Circuits 801 through 804 are shown overlaid over network 800. In network 800, network devices are shown as squares, labeled as ND1 through ND9, and links between network devices are shown as straight lines.

Assume that circuits 801 through 804 are the four circuits, determined in block 620, that are affected by the cluster of alarm messages. As shown in FIG. 8, circuits 801 through 804 overlap one another at various segments of network 800. Circuits 801 through 803, for example, all share the link between ND5 and ND7. Circuit 804, in contrast, traverses ND4 and ND9, which does not overlap any of circuits 801, 802, or 803.

Referring back to FIG. 6, process 600 may further include analyzing the overlap of the set of circuits to locate potential network problems (block 640). Analysis component 420 may, for example, rank network segments based on the number of overlapping circuits, where a larger portion of overlapping circuits for a segment indicates a higher likelihood of there being a network problem at the segment. In FIG. 8, for instance, because three of the four circuits overlap at the network segment between ND5 and ND7, analysis component 420 may determine that the network error is likely to be either at ND5, ND7, or at the link between ND5 and ND7. Additionally, because circuit 804 does not overlap with any of the other circuits, analysis component 420 may determine that it is likely that another network error is responsible for the alarm messages corresponding to circuit 804.

In performing the analysis of block 640, analysis component 420 may take into account information other than the set of determined circuits. Analysis component 420 may include physical network topology information 450 or other information to refine the potential problems identified in block 640. As an example of this, the identified potential network problems may be filtered to ensure that the possible network problems are consistent with the physical network devices, as defined by physical network topology information 450. Thus, for example, if a particular error is identified for a network device that is not capable of producing such as error, the error may be removed as a possible network problem.

In some implementations, analysis component 420 may additionally rank or assign a confidence score to each potential network problem, indicating a confidence level of the network problem being the cause of one or more alarm messages. The rank or confidence score of the potential network problems may be based on an analysis of logical network circuit information 440 and network topology information 450.

Process 600 may further include outputting the identified potential network problems to a network administrator (block 650). Analysis component 420 may transmit the identified potential network problems to output interface 430, which may display one or more of the identified potential network problems via a graphical or other interface. Network administrators can then react to the possible network problems. The potential network problems may be output as a list of one or more network devices, or links between network devices, that are likely to be malfunctioning.

In one implementation, output interface 430 may only present potential network problems that analysis component 420 determines to have at least a threshold level of confidence.

Figure 9:
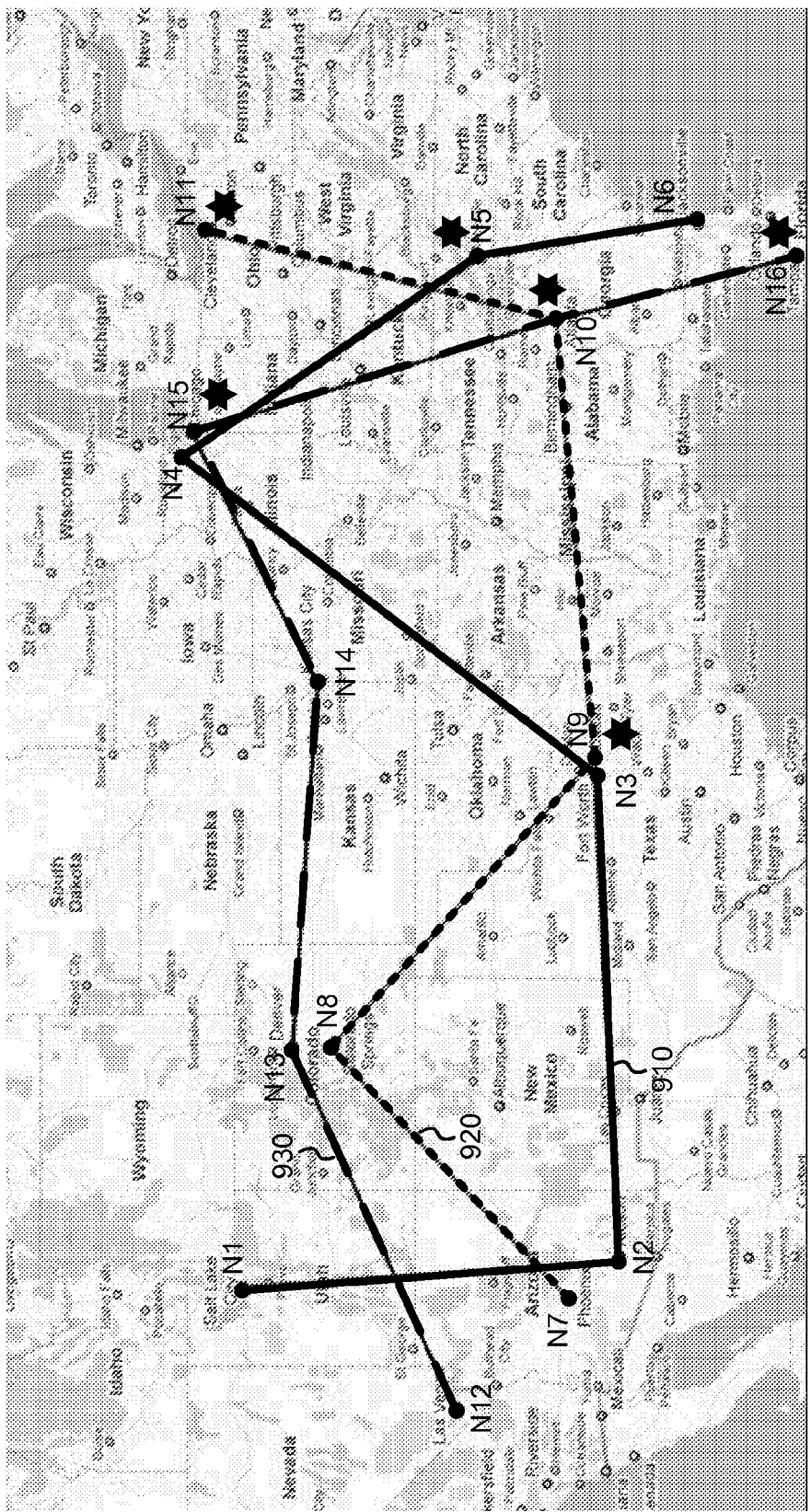
FIG. 9 is a diagram illustrating an example of network devices overlaid on a map of the United States.

Another example of the operation of process 600 will next be discussed with reference to FIG. 9. FIG. 9 is a diagram illustrating network devices, shown as circles, overlaid on a map of the United States. Three circuits are shown in FIG. 9: a first circuit 910, a second circuit 920, and a third circuit 930. Circuit 910 extends from Salt Lake City (node 1-N1), Tucson (N2), Fort Worth (N3), Elgin (N4), Asheville (N5), to Jacksonville (N6). Circuit 920 extends from Phoenix (N7), Colorado Springs (N8), Dallas (N9), Atlanta (N10), to Cleveland (N11). Circuit 930 extends from Las Vegas (N12), Denver (N13), Kansas City (N14), Chicago (N15), Atlanta (N10), to Tampa (N16). A number of network devices may be used to implement each segment of circuits 910, 920, and 930. The particular location and/or configuration of each of the network devices may not be known.

Assume that during a one minute time window, from 02:00 to 02:01, six alarm messages are received and the six alarm messages are placed in a single cluster. The alarm messages are from: Dallas (N9), Atlanta (N10), Chicago (N15), Tampa (N16), Asheville (N5), and Cleveland (N11). The network devices originating these alarm messages are labeled in FIG. 9 with a graphical star.

Circuits 910, 920, and 930 may be determined to be the set of circuits corresponding to the alarms. In this example, the "bad" portion of circuit 920 (nodes N9, N10, and N11) and the "bad" portion of circuit 930 (nodes N15, N10, and N16) overlap at node N10 (Atlanta). Node N10 may thus be determined by analysis component 420 to be the most likely potential network problem.

Analysis component 420 may also determine that node N5 (Asheville) does not have any circuit path overlap with node N10. Asheville may be output as a separate potential network problem.

Network administrators at network management center 130 may view the potential network problems through output interface 430 and, in response, may dispatch two separate technicians to the two problem areas as opposed to sending technicians to all six alarm generating nodes.

As described above, alarm messages received from nodes in a network can be intelligently analyzed based on time-slice clustering of the received alarm messages and based on circuit path information for the network. Based on this analysis, specific network nodes or segments may be identified that are likely to be a root cause of the alarm messages.

The foregoing description provides illustration and description, but is not intended to be exhaustive or to limit the invention to the precise form disclosed. Modifications and variations are possible in light of the above teachings or may be acquired from practice of the invention.

While a series of blocks has been described with regard to FIG. 6, the order of the blocks may be modified in other embodiments. Further, non-dependent blocks may be performed in parallel.

It will be apparent that aspects, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, an application-specific integrated circuit (ASIC), or a field-programmable gate array (FPGA), or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a device and from network devices in a network, alarm messages that indicate a detection of an error condition in the network;
    clustering, by the device, two or more of the alarm messages that occur within a sliding time window into a cluster of alarm messages,
        the sliding time window indicating a time when the two or more of the alarm messages, included in the cluster of the alarm messages, were generated;
    determining, by the device, a set of circuits in the network for the cluster of alarm messages,
        each circuit in the set of circuits being associated with at least one alarm message in the cluster of alarm messages;
    determining, by the device, an overlap of two or more circuits in the set of circuits;
    identifying a potential problem in the network based on the overlap; and
    outputting, by the device, an indication of the potential problem.

2. The method of claim 1, where determining the set of circuits comprises:
    including a circuit in the set of circuits when at least one location associated with the circuit corresponds to a location associated with one of the network devices that generated one of the two or more alarm messages in the cluster of alarm messages.

3. The method of claim 1, where each circuit in the set of circuits includes a path through the network.

4. The method of claim 3, where the path includes one of:
    a path between two or more geographic locations, or
    a path between two or more of the network devices.

5. The method of claim 1, further comprising:
    logging a first alarm message of the alarm messages in a log entry that includes an identifier associated with one of the network devices that generated the first alarm message, a timestamp value indicating when the first alarm message was generated, and an error code that identifies a network error that caused the first alarm message to be generated.

6. The method of claim 1, where identifying the potential problem comprises:
    obtaining topology information associated with the network,
    the topology information describing a physical arrangement and capabilities of the network devices, and
    determining that the potential problem is consistent with the topology information.

7. The method of claim 1, further comprising:
    assigning a value, to the potential problem, that indicates a confidence level of the potential problem being a cause of one or more of the alarm messages.

8. The method of claim 1, where the overlap is at a segment of the network or at one of the network devices that is traversed by the two or more circuits.

9. The method of claim 1, where identifying the potential problem based on the overlap comprises:
    determining a different overlap of two or more other circuits in the set of circuits,
    determining that a first quantity of the two or more circuits is greater than a second quantity of the two or more other circuits, and
    identifying that the potential problem is associated with the overlap due to the first quantity being greater than the second quantity.

10. A device comprising:
    a memory; and
    one or more processors to:
        log alarm messages, received from network devices in a network, indicating detection of an error condition in the network,
            the alarm messages identifying the network devices that generated the alarm messages, and
            the alarm messages being associated with time values,
        assign, based on the time values, two or more of the alarm messages that occur within a sliding time window to an alarm message cluster,
        analyze the two or more of the alarm messages, included in the alarm message cluster, to determine a potential cause of the alarm messages, and
        output the potential cause of the alarm messages.

11. The device of claim 10,
    where the potential cause of the alarm messages is one of:
        a malfunctioning of one or more of the network devices, or
        a malfunctioning of a link that connects two of the network devices.

12. The device of claim 10, where, when outputting the potential cause of the alarm messages, the one or more processors are to:
    output the potential cause of the alarm messages via a graphical interface.

13. The device of claim 10, where the time values include timestamps that indicate when the alarm messages were generated.

14. The device of claim 10, where the network devices include one or more of routers, switches, bridges, or gateways.

15. The device of claim 10, where, when analyzing the two or more of the alarm messages, the one or more processors are to:

determine paths in the network that are associated with the alarm message cluster, determine an overlap of two or more of the paths at a link of the network or at one of the network devices, and identify the potential cause of the alarm messages based on the overlap.

16. The device of claim 15, where, when identifying the potential cause of the alarm messages, the one or more processors are to:

obtain topology information that describes a physical arrangement and capabilities of the network devices, and determine that the potential cause of the alarm messages is consistent with the topology information.

17. The device of claim 10, where each of the alarm messages includes:

an error code that identifies a network error that caused one or more of the alarm messages to be generated.

18. The device of claim 10, where the one or more processors are further to:

assign a value, to the potential cause of the alarm messages, that indicates a confidence level of the potential cause being a cause of the alarm messages.

19. A non-transitory computer-readable storage medium containing instructions, the instructions comprising:

one or more instructions, executable by one or more processors, to store alarm messages that indicate an error condition detected in a network that is being monitored;

one or more instructions, executable by the one or more processors, to include, in a cluster of alarm messages, two or more of the alarm messages that occur within a sliding time window, the sliding time window indicating a time during which the two or more of the alarm messages were generated; and one or more instructions, executable by the one or more processors, to determine a set of circuits for the cluster of alarm messages, each circuit in the set of circuits being associated with at least one alarm message in the cluster of alarm messages, and one or more instructions, executable by the one or more processors, to determine an overlap of two or more circuits in the set of circuits;

one or more instructions, executable by the one or more processors, to identify a potential problem in the network based on the overlap; and one or more instructions, executable by the one or more processors, to output an indication of the potential problem.

20. The non-transitory computer-readable storage medium of claim 19, where the one or more instructions to identify the potential problem comprise:

one or more instructions to determine that the potential problem is consistent with topology information, the topology information describing a physical arrangement and capabilities of network devices in the network.

* * * * *